Aug. 21, 1962   R. W. BISHOP ETAL   3,050,376
APPARATUS FOR DISPOSAL OF CARBURETOR AND CRANKCASE FUMES
Filed Feb. 6, 1958

INVENTORS
Ralph W. Bishop,
Joseph T. Wentworth &
Lloyd R. Withrow
BY  G. M. Shampo
ATTORNEY

3,050,376
APPARATUS FOR DISPOSAL OF CARBURETOR AND CRANKCASE FUMES

Ralph W. Bishop and Joseph T. Wentworth, Royal Oak, and Lloyd L. Withrow, Rochester, Mich., assignors to General Motors Corporation, Detroit, Mich., a corporation of Delaware
Filed Feb. 6, 1958, Ser. No. 713,667
1 Claim. (Cl. 23—288)

This invention relates to an apparatus for reducing the pollution of the atmosphere due to the operation of internal combustion engines, and more specifically to an apparatus means for disposal of carburetor and crankcase fumes.

In accordance with the current theory on atmosphere pollution, hydrocarbons and other organic compounds react in the atmosphere and form compounds that reduce visibility and irritate the eyes and nose. In certain areas of the country having relatively large population centers, atmospheric conditions at times cause a build up of air pollutants to the point where a serious "smog" condition is created.

Automobile exhaust fumes have been alleged to seriously contribute to the creation of "smog" nuisance and the automotive industry has been actively researching the catalytic oxidation of exhaust fumes as a possible solution to the smog problem. In this connection, we have found that in addition to exhaust fumes, gasoline fumes from the carburetor vent and fumes from the crankcase breather tube, the latter being hereinafter referred to as blowby fumes, are additional sources of pollutants contributing to the smog nuisance.

Accordingly, it is an object of our invention to provide a system for pumping carburetor vent and blowby fumes into a catalytic converter. It is a further object of our invention to provide means for aspirating carburetor vent and blowby fumes into the converter. It is a further object of our invention to provide means for aspirating carburetor vent and blowby fumes into the exhaust fumes. It is a further object of our invention to provide a system for drawing the carburetor vent and blowby fumes into the converter auxiliary air stream.

These and other objects of our invention are attained by pumping the carburetor vent and blowby gases into a catalytic converter together with at least sufficient air to oxidize the total combustible content of the gases.

Figure 1:
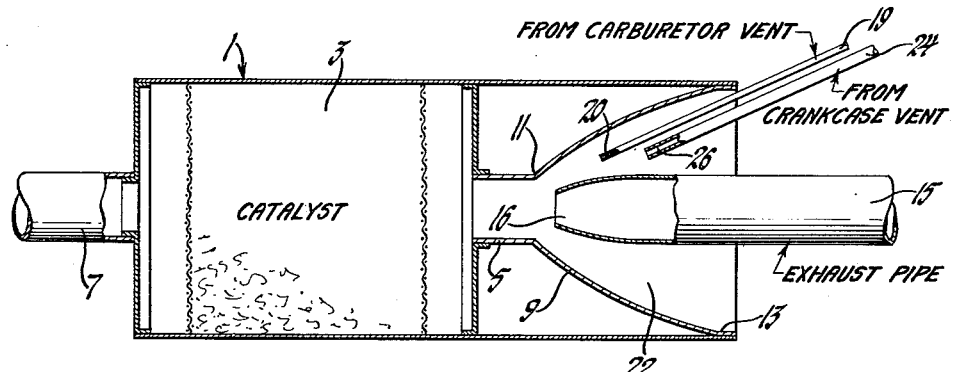
Figure 2:
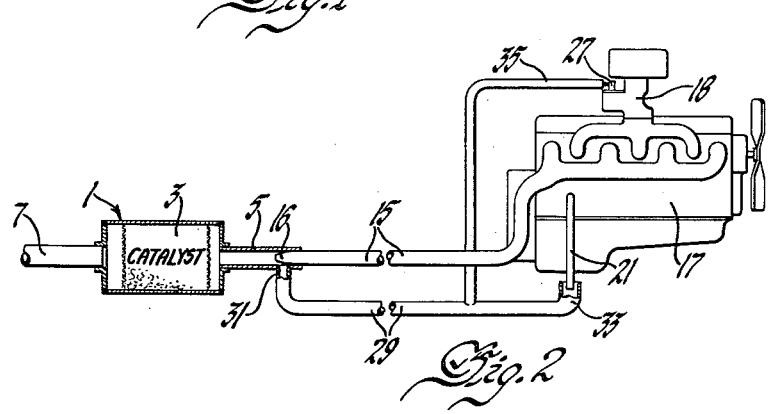
Figure 3:
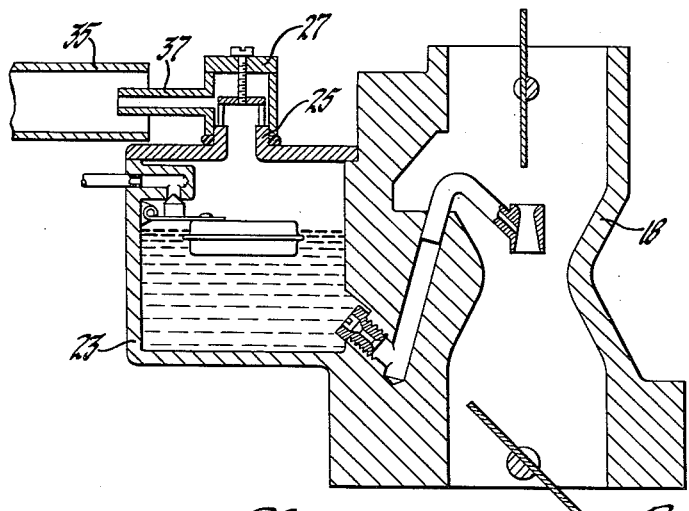

The ntaure and objects of our invention will be apparent from the foregoing description when read in conjunction with the accompanying drawings in which FIGURE 1 is a diagrammatic view of a simplified system for pumping carburetor vent and blowby fumes into a catalyst converter; FIGURE 2 is a diagrammatic view of a preferred system for pumping carburetor vent and blowby fumes into a catalytic converter; and FIGURE 3 is an enlarged view in section of the carburetor float bowl and means for removing vent fumes therefrom shown in FIGURE 2.

It is generally theorized that certain products of combustion resulting from the operation of internal combustion engines act to pollute the air and irritate the eyes and nose when present in sufficiently high concentrations. It is also theorized that photochemical reactions between certain hydrocarbons and oxides of nitrogen and the oxygen and moisture of the air result in the formation of air polluting and irritating compounds. While much attention has been given recently to the hydrocarbon and carbon monoxide content of automobile exhaust gas, our studies and extensive testing have shown that blowby fumes and carburetor vent fumes are also sources of air pollutants.

Blowby fumes, crankcase breather fumes, have been found to contain the following compounds generally referred to as noxious and as atmospheric impurities contributing to "smog": carbon monoxide; hydrocarbons such as paraffins and olefins of $C_1$ to $C_6$ type and aromatics such as benzene and compounds of higher molecular weight; formic acid; aldehydes such as formaldehyde, acetaldehyde, propionaldehyde and acrolein; and cyclic hydrocarbons such as cyclopentane and cyclohexane. Such constituents have been found in amounts varying from about 1.4 to 2.9 mol percent of the sample, depending on engine operating conditions. The concentration of pollutants in blowby was found to increase with increase in power and richness of fuel-air mixture. The quantity of blowby has been found to be a direct function of power output and of the engine condition, that is, the piston ring and cylinder wear, with an engine in poor mechanical condition showing as much as a tenfold increase over one in good condition.

The aggravation of air pollution by reason of carburetor vent fumes is a condition inherent in fuel feeding systems utilizing carburetors of conventional design; means for venting gasoline vapor from the carburetor bowl is essential in order to preclude build up of vapor pressure as the engine warms up during operation, any build up of pressure being detrimental to controlled fuel metering.

We have found that carburetor bowl temperatures as much as 77° F. above ambient (ambient temperatures were measured as being from 80–100° F.) are present when operating a motor vehicle at city driving speeds of from about 5 to 15 m.p.h. The measured loss of fuel from the carburetor vent under such conditions, city driving and ambient of 80° F., using a fuel having a Reid vapor pressure of 8.0 pounds was found to be as high as 2.9% by weight of the fuel used. At an ambient temperature of 90° F. the loss increased to about 7.6%. Chromatographic analysis of the vented vapor when using a premium commercial gasoline showed a composition of from about 1 to 4% olefins, a trace of aromatics and the balance substantially all paraffins of from 3 to 7 carbon atoms per molecule. It is thus apparent that carburetor loss, especially at low driving speeds, is quite significant.

Having reference to the drawing, there is shown in FIGURE 1 a system for pumping gases from the carburetor vent and from the crankcase breather tube into a catalyst converter for the burning of the carbon monoxide, hydrocarbon and other compounds having a polluting effect on the atmosphere. The converter 1 comprises a catalyst chamber 3 having an air and combustible gas inlet pipe 5 and an exhaust pipe 7. Connected with the inlet pipe 5 is a venturi or aspirator type air inlet 9 having its narrow end 11 open and connected with the inlet 5 and its wide end 13 open to atmosphere. The converter 1 is adapted to catalytically oxidize combustible gases in the engine exhaust. It is our intent to utilize the energy of the engine exhaust in pumping the carburetor vent and blowby fumes into the catalyst chamber 3. To this end, the exhaust pipe 15 is combined with the converter 1 so as to position the outlet end 16 of the exhaust pipe at the throat of the venturi member 9, the energy of the exhaust gases being thus utilized to aspirate or pump necessary air for the catalytic conversion of the exhaust gases into the chamber 3. A tube 19 is connected with the carburetor vent in any suitable manner, the manner of connection being not shown since this forms no part of our invention, and the end 20 thereof is positioned in the air plenum 22 in order that the carburetor vent fumes may be picked up by the inlet air stream and drawn into the catalyst chamber 3 together with the exhaust fumes. In a similar manner, a tube 24 is connected with the crankcase breather tube and the end 26 thereof is similarly positioned in the air plenum 22. In this manner, the carburetor vent fumes and the blowby fumes from the engine crankcase are simply and conveniently pumped into the converter 1 for combustion with attendant purification of these gaseous streams which would otherwise carry polluting and irritating compounds into the atmosphere.

It should be noted that an excellent mixture between the air stream and the vent and blowby fumes is obtained thus assuring optimum catalytic oxidation. The pumping action provided for drawing carburetor vent and blowby fumes into the catalyst chamber 3 should be such as not to cause an excessive suction which would upset carburetor metering and crankcase ventilation. While other pumping methods may be utilized than that disclosed in FIGURE 1, i.e., blower means may be placed in tubes 19 and 24 or tubes 19 and 24 may be connected directly with the exhaust pipe 15, in using the aspirating method shown in FIGURE 1 the ends of tubes 19 and 24 should be so placed within the air plenum 22 that the air movement which entrains the fumes has minimum effect in disturbing the normal fuel metering and crankcase ventilation of the engine.

There is shown in FIGURE 2 a preferred embodiment for the pumping of carburetor vent and blowby fumes into the conversion chamber. As in FIGURE 1, the converter 1 comprises a catalyst chamber 3 having an inlet pipe 5 and an exhaust opening and pipe 7. Connected with the inlet pipe 5 is the exhaust pipe 15 of the engine 17. As is conventional, the engine 17 is provided with a carburetor 18 and a crankcase breather tube 21. Carburetor 18, as shown more clearly in FIGURE 3, is provided with the conventional float bowl 23 having a vent opening 25 which, as disclosed above, is normally open to atmosphere with the result that air polluting compounds due to evaporation of gasoline are unloaded into the atmosphere. In accordance with our invention, a carburetor vent fume collector cap 27 is secured in any suitable manner on the vent 25 in order that the fumes may be collected and drawn off to the converter 1. In the embodiment shown in FIGURE 2, air for the catalytic combustion of the exhaust fumes is drawn in from the area immediately adjacent the engine 17, the air inlet pipe 29 having its exit end 31 connected with the gas inlet pipe 5 at a point adjacent the outlet end 16 of the exhaust pipe 15. As in FIGURE 1, the energy of the exhaust gases acts to aspirate air into the converter 1. In order that there may be minimum disturbance on the fuel metering and crankcase ventilation, the inlet end of the pipe 29 is so formed as to provide two branches, the open end of one branch 33 being sleevedly positioned about the open end of breather tube 21, the open end of the other branch 35 being similarly sleevedly positioned about a tube 37 connected with the collector cap 27. As is clearly shown in FIGURES 2 and 3 the open ends of branches 33 and 35 of the air intake pipe 29 are spaced apart from the wall of the tubes 21 and 37 about which they are, respectively, positioned. In this manner, the air movement into branches 33 and 35 entrains the fumes from the crankcase breather tube 21 and from the carburetor vent tube 37 with minimum disturbance on their designed operating characteristics. Where necessary, an auxiliary air intake pipe may be provided in pipe 5 in a manner similar to the connection of pipe end 31 with pipe 5 in order that an auxiliary air intake may be used to control the flow of air about tubes 21 and 37.

From the foregoing, it is apparent that we have provided a system for decreasing the atmospheric pollution due to internal combustion engine operation by providing for the catalystic combustion of carburetor vent fumes and crankcase breather fumes. While we have described our invention in terms of a preferred embodiment wherein the energy of the exhaust gases is used to aspirate the necessary air for combustion and for entraining in such air the vent and blowby fumes, other embodiments may be apparent to those skilled in the art, such embodiments being within the scope of our invention as covered by the claim which follows.

We claim:

A system for minimizing air pollution due to operation of internal combustion engines while minimizing disturbance of normal engine operation comprising a catalytic converter having a gas inlet, an air inlet pipe connected with said gas inlet, an engine exhaust pipe connected with said gas inlet and cooperating with said air inlet pipe so as to constitute an aspirator for drawing air therein, a crankcase vent tube interconnected with the engine crankcase, a carburetor vent tube interconnected with the carburetor of the engine, and the end of said air inlet pipe remote from the catalytic converter being formed with two branches, one branch being positioned sleevedly about and spaced apart from the outside surface of said crankcase vent tube and the other branch being sleevedly positioned about and spaced apart from the outside surface of said carburetor vent tube to enable the entrainment of venting fumes by the aspirated air.

References Cited in the file of this patent
UNITED STATES PATENTS

| | | |
|---|---|---|
| 1,839,879 | Hyatt | Jan. 5, 1932 |
| 1,847,506 | White | Mar. 1, 1932 |
| 1,875,024 | Kryzanowsky | Aug. 30, 1932 |
| 2,776,875 | Houdry | Jan. 8, 1957 |